(12) United States Patent
Dobashi

(10) Patent No.: US 11,920,667 B2
(45) Date of Patent: Mar. 5, 2024

(54) CAM DEVICE, PART MANUFACTURING DEVICE, BEARING MANUFACTURING DEVICE, PART MANUFACTURING METHOD, MACHINE MANUFACTURING METHOD, AND CAM DEVICE MINIATURIZATION METHOD

(71) Applicant: NSK LTD., Tokyo (JP)

(72) Inventor: Kouhei Dobashi, Fujisawa (JP)

(73) Assignee: NSK LTD., Tokyo (JP)

( * ) Notice: Subject to any disclaimer, the term of this patent is extended or adjusted under 35 U.S.C. 154(b) by 45 days.

(21) Appl. No.: 17/434,846

(22) PCT Filed: Jan. 8, 2020

(86) PCT No.: PCT/JP2020/000360
§ 371 (c)(1),
(2) Date: Aug. 30, 2021

(87) PCT Pub. No.: WO2020/225943
PCT Pub. Date: Nov. 12, 2020

(65) Prior Publication Data
US 2022/0325788 A1    Oct. 13, 2022

(30) Foreign Application Priority Data

May 7, 2019  (JP) .................................. 2019-087612

(51) Int. Cl.
*F16H 53/06* (2006.01)
*F16H 25/08* (2006.01)
(Continued)

(52) U.S. Cl.
CPC ............. *F16H 53/06* (2013.01); *F16H 25/14* (2013.01); *F16H 53/02* (2013.01)

(58) Field of Classification Search
CPC .......... F16H 25/08; F16H 25/14; F16H 25/18; F16H 53/02; F16H 53/06
See application file for complete search history.

(56) References Cited

U.S. PATENT DOCUMENTS 6,073,503 A * 6/2000 Matsuno ................. B65B 65/02
74/53
8,746,094 B2 * 6/2014 Lestienne ............... F16H 25/18
74/50
(Continued)

FOREIGN PATENT DOCUMENTS

CH            383108 A  * 10/1964
DE  10 2015 209 611 A1   12/2016
(Continued)

OTHER PUBLICATIONS

Office Action dated Nov. 30, 2021, issued by the Japan Patent Office in counterpart Japanese Patent Application No. 2019-031699.
(Continued)

*Primary Examiner* — Adam D Rogers
(74) *Attorney, Agent, or Firm* — Sughrue Mion, PLLC

(57) ABSTRACT

A cam device includes a cam, a cam roller, a rotary drive device, a linear motion guide device, and an action unit. A cam profile of the cam includes a rotary end at a circumferential one end, at which a camshaft is non-rotatable in a reverse direction by the cam roller, a cam surface from the rotary end to the circumferential other end, on which the cam roller is abuttable, and formed of a single CV curve from a vicinity of the rotary end to the circumferential other end of the cam surface, and a non-continuous section formed between the rotary end and the circumferential other end of the cam surface and not in contact with the cam roller.

8 Claims, 8 Drawing Sheets

(51) Int. Cl.
*F16H 25/14* (2006.01)
*F16H 53/02* (2006.01)

(56) References Cited

U.S. PATENT DOCUMENTS

| | | | |
|---|---|---|---|
| 10,125,852 B2 * | 11/2018 | Cao | F16H 19/001 |
| 2014/0137675 A1 | 5/2014 | Suzuki et al. | |
| 2016/0215863 A1 | 7/2016 | Cao et al. | |

FOREIGN PATENT DOCUMENTS

| DE | 102016207237 B4 * | 2/2018 |
|---|---|---|
| GB | 667080 A * | 2/1952 |
| JP | 50-69470 A | 6/1975 |
| JP | 51-27785 U | 2/1976 |
| JP | 59-75959 U | 5/1984 |
| JP | 10-246309 A | 9/1998 |
| JP | 2004-339951 A | 12/2004 |
| JP | 2011-243500 A | 12/2011 |
| JP | 2014-218905 A | 11/2014 |
| JP | 2016-535222 A | 11/2016 |
| WO | 2019/087452 A1 | 5/2019 |

OTHER PUBLICATIONS

International Search Report dated Mar. 17, 2020 issued by the International Searching Authority in counterpart International Application No. PCT/JP2020/000360 (PCT/ISA/210).

International Written Opinion dated Mar. 17, 2020 issued by the International Searching Authority in counterpart International Application No. PCT/JP2020/000360 (PCT/ISA/237).

Communication dated Jan. 26, 2022 issued by the European Patent Office in counterpart European Application No. 20802943.9.

* cited by examiner

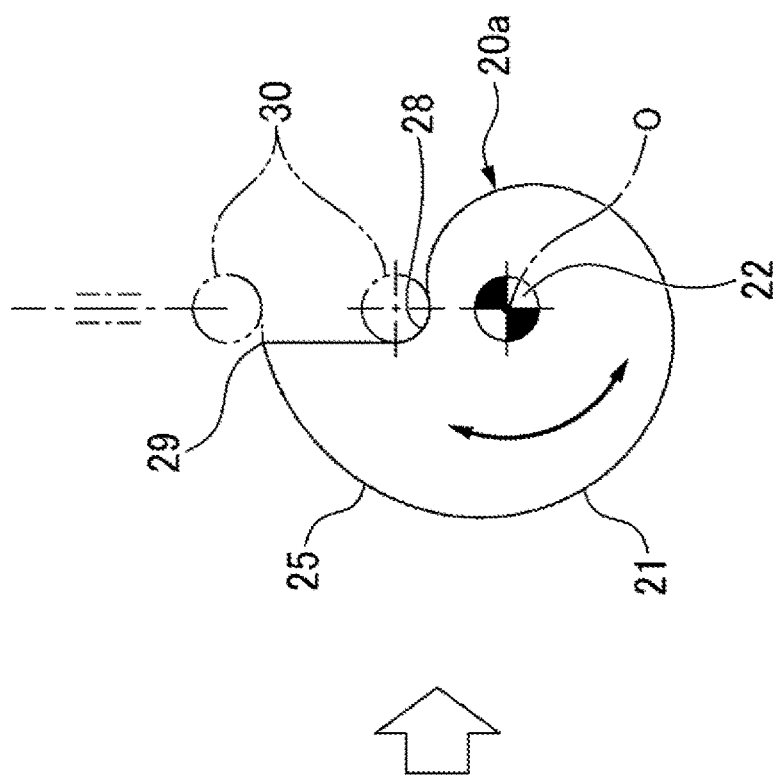
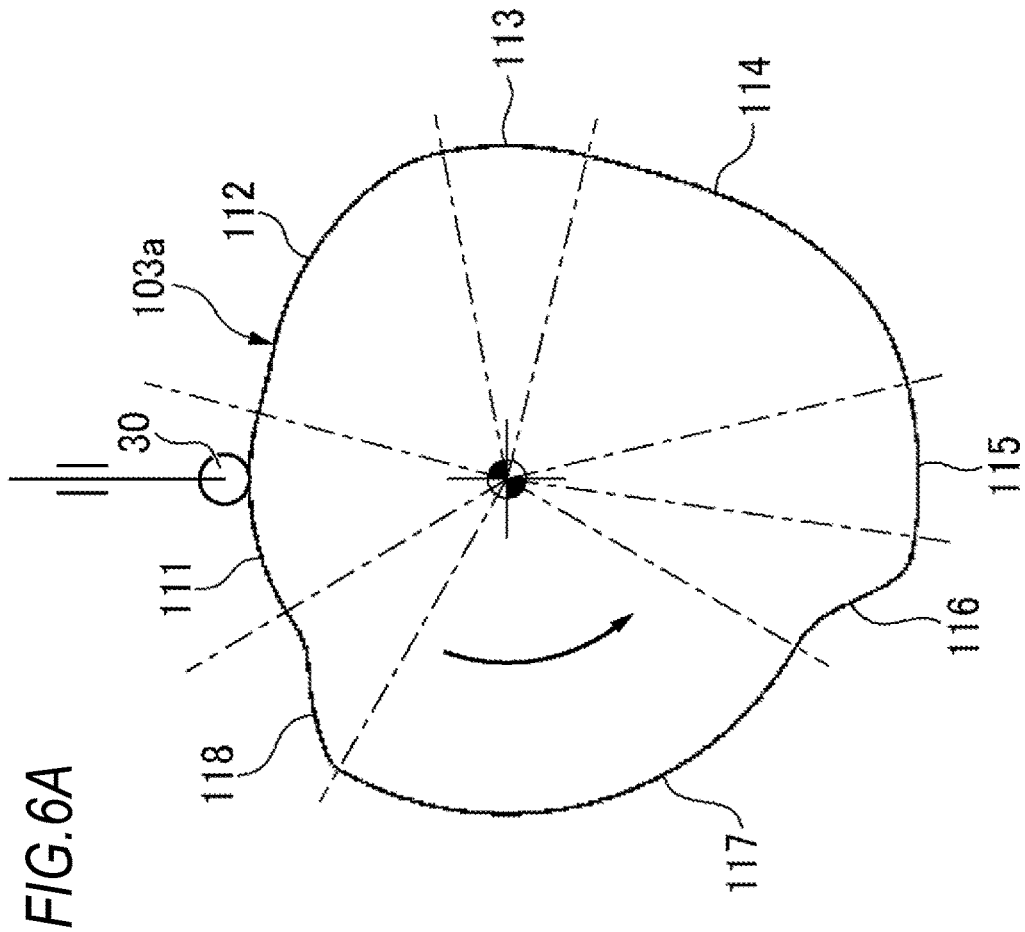

FIG.9  -PRIOR ART-
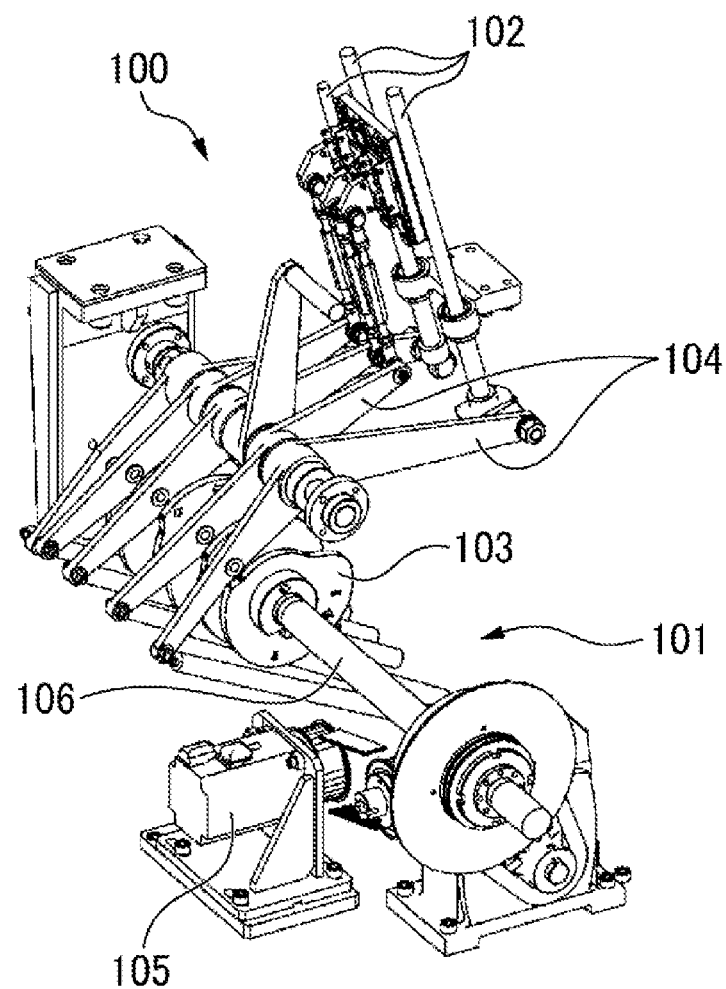

11,920,667 B2

CAM DEVICE, PART MANUFACTURING DEVICE, BEARING MANUFACTURING DEVICE, PART MANUFACTURING METHOD, MACHINE MANUFACTURING METHOD, AND CAM DEVICE MINIATURIZATION METHOD

CROSS-REFERENCE TO RELATED APPLICATIONS

This application is a National Stage of International Application No. PCT/JP2020/000360 filed Jan. 8, 2020, claiming priority based on Japanese Patent Application No. 2019-087612, filed May 7, 2019, the contents of all of which are incorporated herein by reference in their entirety.

TECHNICAL FIELD

The present invention relates to a cam device, a part manufacturing device, a bearing manufacturing device, a part manufacturing method, a machine manufacturing method, and a cam device miniaturization method.

BACKGROUND ART

In a typical plate cam and a cylindrical cam, which are widely and generally known technologies, a lift region and a dwell region are formed on a circumferential surface of the plate cam or the cylindrical cam, or on an end surface of a cylinder according to a required movement, and a cam roller is rectilinearly moved according to a shape of the lift region and the dwell region by rotating the cam in one direction.

That is, a cam surface of the plate cam or the cylindrical cam is a continuous closed track formed of a combination of the lift region and the dwell region for performing the forward step, return step, and stop step of the cam roller. FIG. 9 illustrates an example of a cam device 101 used in a bearing manufacturing device 100. In this type of manufacturing device 100, since it is necessary to perform a plurality of complicated handlings on a small workpiece at the same time and in conjunction with each other, a plurality of action units 102 are driven by one drive motor 105 via a spindle 106 by using a plurality of cam plates 103, a plurality of rocker arms 104, and the like corresponding to each of the action units.

In the plurality of cam devices of Patent Document 1, the main cam and the auxiliary cam that is rotated faster than the main cam are arranged so as to overlap with each other, and the step of a sudden change of the main cam is performed by the auxiliary cam, thereby reducing the pressure angle of the cam to a very small extent and achieving smooth movement. Patent Document 2 describes a stationary position holding type cam which is configured with an outer shape having a portion in which the displacement from the center of a rotation axis is constant in a certain range of the rotation angle, and the displacement obtained by the cam is self-held in that range.

PRIOR ART DOCUMENT

Patent Document

Patent Document 1: JP-A-S50-69470
Patent Document 2: JP UM-A-S59-75959

SUMMARY OF INVENTION

Technical Problem

Meanwhile, in the conventional bearing manufacturing device 100 illustrated in FIG. 9, when the speed on the output side is increased at the same rotation speed of the spindle 106, the allocation angle of the lift region is reduced, and when a larger stroke is required, the lift stroke is increased, and in both cases, a larger diameter is required due to the limitation of the pressure angle. As a result, with respect to a plurality of action units 102 that are to be integrated and arranged in a narrow range, it is difficult to integrate the cam plate 103 in the vicinity of the action units 102, and the size of the entire cam device 101 is increased due to use of a mechanism such as the rocker arm 104 and the like.

In Patent Document 1, there is a problem that the drive mechanism for rotating the main cam and the auxiliary cam is complicated, and it is difficult to miniaturize and simplify the entire cam device. Further, also in Patent Document 2, it is necessary to have a dwell region, which further requires to make the cam smaller.

The present invention has been made in view of the problems described above, and an object of the present invention is to provide a cam device in which a cam is miniaturized and an operation profile of a mechanism can be varied, and a part manufacturing device, a bearing manufacturing device, a method for manufacturing a part, and a method for manufacturing a machine, which are capable of miniaturizing the overall device by using the cam device, and a method for miniaturizing a cam device.

Solution to Problem

The above object of the present invention is achieved by the following configurations.

(1) A cam device including: a cam integrally attached to a camshaft to rotatably move around the camshaft in forward and reverse directions;
a cam roller linearly moved by a rotational motion of the cam around the camshaft;
a rotary drive device that rotationally drives the camshaft by controlling a forward rotation, a reverse rotation, a rotation stop, and a rotation speed;
a linear motion guide device that guides a driven member that is linearly moved along with the cam roller; and
an action unit attached to the driven member, in which
a cam surface forming a cam profile of the cam includes a rotary end at a circumferential one end, at which the camshaft is non-rotatable in a reverse direction by the cam roller, a lift region from the rotary end to the circumferential other end, on which the cam roller is abuttable, and formed of a single constant velocity (CV) curve from a vicinity of the rotary end to the circumferential other end, and a non-continuous section formed between the rotary end and the circumferential other end and not in contact with the cam roller.

(2) The cam device according to (1), in which the rotary drive device performs one of rotational driving by controlling the forward rotation, the reverse rotation, the rotation stop, and the rotation speed of the camshaft, thereby realizing a cam curve including a lift up step, a lift down step, and a pause step,
cam curve characteristics in the lift up step and the lift down step are reproduced by controlling an angular velocity and an angular acceleration in a rotational motion of the cam when the cam roller passes through the lift region formed of the single CV curve, a lift amount in the lift up step and the lift down step is reproduced by a rotation amount in the rotational motion of the cam, an output displacement in the lift up step and the lift down step is reproduced at a position in a rotational direction in the rotational motion of the cam, a stop time in the pause step is reproduced by a stop time of the cam, and an operation time in the lift up step and the lift down step is reproduced by a time of the rotational motion of the cam.

(3) The cam device according to (1) including a control unit that controls an actuation of the rotary drive device such that the rotary drive device performs any of rotational driving by controlling the forward rotation, the reverse rotation, the rotation stop, and the rotation speed of the camshaft in order to realize a cam curve including a lift up step, a lift down step, and a pause step, in which the control unit includes an angular velocity and angular acceleration control unit that controls an angular velocity and an angular acceleration in the rotational motion of the cam when the cam roller passes through the lift region formed of the single CV curve in order to reproduce cam curve characteristics in the lift up step and the lift down step, a rotation amount control unit that controls a rotation amount in the rotational motion of the cam in order to reproduce a lift amount in the lift up step and the lift down step, a position control unit that controls a position in a rotational direction in the rotational motion of the cam in order to reproduce an output displacement in the lift up step and the lift down step, a stop time control unit that controls a stop time of the cam in order to reproduce a stop time in the pause step, and a motion time control unit that controls a rotational motion time of the cam in order to reproduce an operation time in the lift up step and the lift down step.

(4) The cam device according to any one of (1) to (3), further including a pressing spring for urging the cam roller toward the camshaft on a support shaft or the driven member of the cam roller.

(5) A part manufacturing device including a plurality of cam devices according to any one of (1) to (4), in which cams of the plurality of cam devices can be separately driven by respective rotary drive devices, and while at least one of the plurality of cam devices is lifting up or down the cam roller, a state of suspending the cam roller with at least another one of the plurality of cam devices can be realized by driving each of the rotary drive devices of the plurality of cam devices.

(6) A bearing manufacturing device including a plurality of cam devices according to any one of (1) to (4), in which cams of the plurality of cam devices can be separately driven by respective rotary drive devices, and while at least one of the plurality of cam devices is lifting up or down the cam roller, a state of suspending the cam roller with at least another one of the plurality of cam devices can be realized by driving each of the rotary drive devices of the plurality of cam devices.

(7) A method for manufacturing a part, the method includes manufacturing the part by using a plurality of cam devices according to any one of (1) to (4), in which the cams of the plurality of cam devices are separately driven by respective rotary drive devices, and while at least one of the plurality of cam devices is lifting up or down the cam roller, a state of suspending the cam roller with at least another one of the plurality of cam devices can be realized by driving each of the rotary drive devices of the plurality of cam devices.

(8) A method for manufacturing a machine, the method includes manufacturing the machine by using a plurality of cam devices according to any one of (1) to (4), in which the cams of the plurality of cam devices are separately driven by respective rotary drive devices, and while at least one of the plurality of cam devices is lifting up or down the cam roller, a state of suspending the cam roller with at least another one of the plurality of cam devices can be realized by driving each of the rotary drive devices of the plurality of cam devices.

(9) A method for miniaturizing a cam device including:

a cam rotatably moved around a camshaft in forward and reverse directions;

a cam roller linearly moved by a rotational motion of the cam around the camshaft;

a rotary drive device that rotationally drives the camshaft by controlling a forward rotation, a reverse rotation, a rotation stop, and a rotation speed;

a linear motion guide device that guides a driven member that is linearly moved along with the cam roller; and an action unit attached to the driven member, in which a cam surface forming a cam profile of the cam includes a rotary end at a circumferential one end, at which the camshaft is non-rotatable in a reverse direction by the cam roller, a lift region from the rotary end to the circumferential other end, on which the cam roller is abuttable, and formed of a single CV curve from a vicinity of the rotary end to the circumferential other end, and a non-continuous section formed between the rotary end and the circumferential other end and not in contact with the cam roller such that the cam and the rotary drive device for rotationally driving the cam can be miniaturized.

Advantageous Effects of Invention

According to the cam device of the present invention, the cam can be miniaturized and the operation profile of the mechanism can be varied.

Further, according to the part manufacturing device, the bearing manufacturing device, the part manufacturing method, and the machine manufacturing method of the present invention, the entire device can be miniaturized by using the cam device.

Further, according to the method for miniaturizing the cam device of the present invention, the cam and the rotary drive device can be miniaturized, and the overall cam device can also be miniaturized.

BRIEF DESCRIPTION OF DRAWINGS

FIG. 6A is a side view illustrating another conventional cam, which represents a different cam diagram from FIG. 5, and FIG. 6B is a side view illustrating another cam according to the present embodiment, which represents a different cam diagram from FIG. 5.

FIG. 9 is a perspective view illustrating a conventional bearing manufacturing device.

DESCRIPTION OF EMBODIMENT

Hereinafter, a cam device according to an embodiment of the present invention will be described in detail with reference to the drawings.

Figure 1:
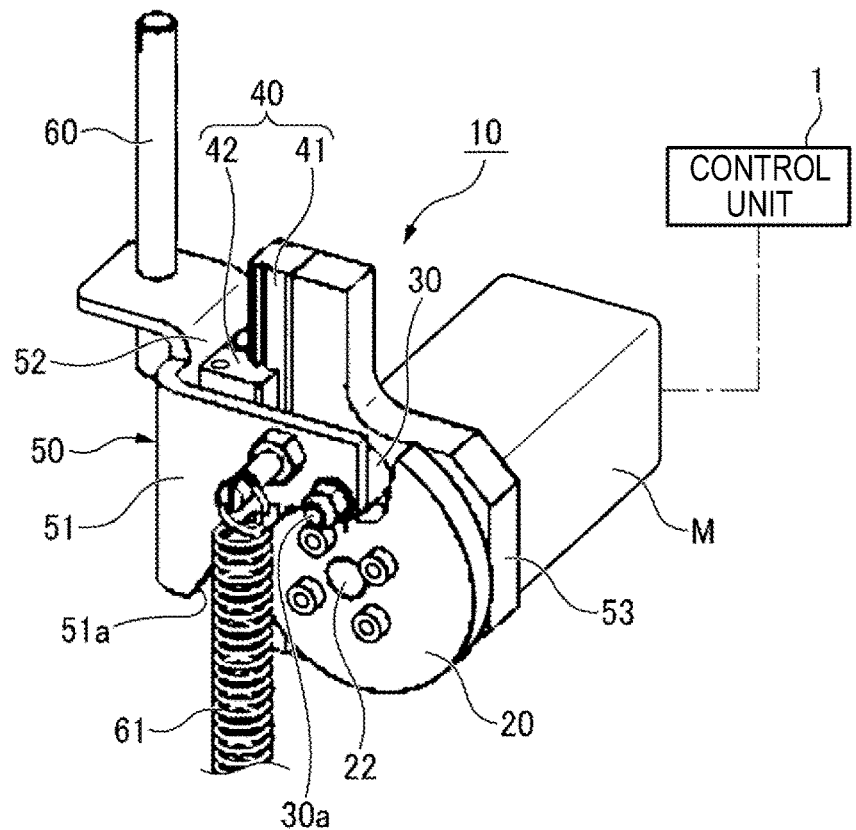
FIG. 1 is a perspective view illustrating a cam device according to an embodiment of the present invention.
Figure 2:
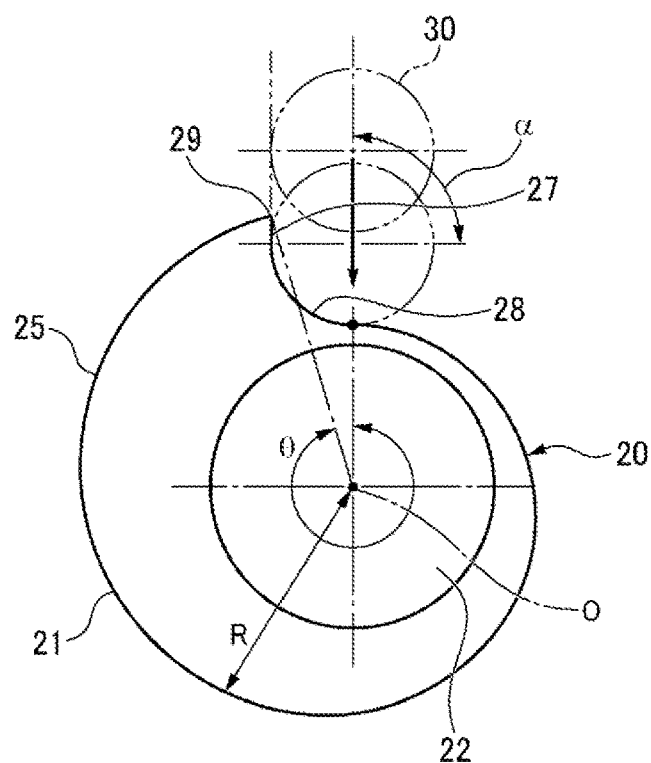
FIG. 2 is a side view illustrating a cam of the cam device illustrated in FIG. 1.

As illustrated in FIGS. 1 and 2, the cam device 10 according to the embodiment includes a cam 20 integrally attached to a camshaft 22 to rotatably move around the camshaft 22 in forward and reverse directions, a cam roller 30 linearly moved by a rotational motion of the cam 20 around the camshaft 22, and a rotary drive device M that rotationally drives the camshaft 22 by controlling a forward rotation, a reverse rotation, a rotation stop, and a rotation speed. Further, the cam device 10 includes a linear motion guide device 40 that guides a driven member 50 that is linearly moved along with the cam roller 30, an action unit 60 attached to the driven member 50, and a pressing spring 61 attached to the driven member 50 and urging the cam roller 30 toward the camshaft 22.

The rotary drive device M is fixed to a fixing member 53, and a drive shaft of the rotary drive device M is integrally and rotatably connected to the camshaft 22 through a hole (not illustrated) of the fixing member 53.

Further, as illustrated in FIG. 2, a cam surface 21 forming the cam profile of the cam 20 is formed on a portion in a circumferential direction, while having a non-continuous section 27 formed on an outer periphery where the cam roller 30 does not contact. Specifically, the cam surface 21 includes a rotary end 28 at a circumferential one end, at which the camshaft 22 is non-rotatatable in a reverse (clockwise in FIG. 2) direction by the cam roller 30, a lift region 25 from the rotary end 28 to the circumferential other end, on which the cam roller 30 is abuttable, and formed of a single CV curve from the vicinity of the rotary end 28 to the circumferential other end, and a non-continuous section 27 formed between the rotary end 28 and the circumferential other end and not in contact with the cam roller 30. Further, the circumferential other end of the cam surface 21 is an open end 29 that allows the camshaft 22 to rotate in the forward direction (counterclockwise in FIG. 2) while the cam roller 30 is abutting on the circumferential other end. Further, the non-continuous section 27 is formed between the rotary end 28 at circumferential one end and the open end 29 at the circumferential other end.

In this embodiment, the rotary end 28 has an arc shape along an outer peripheral surface of the cam roller 30.

Further, in the following description, forward rotation is when the camshaft 22 is rotated in the forward direction (counterclockwise), and reverse rotation is when it is rotated in the reverse direction (clockwise).

Figure 3:
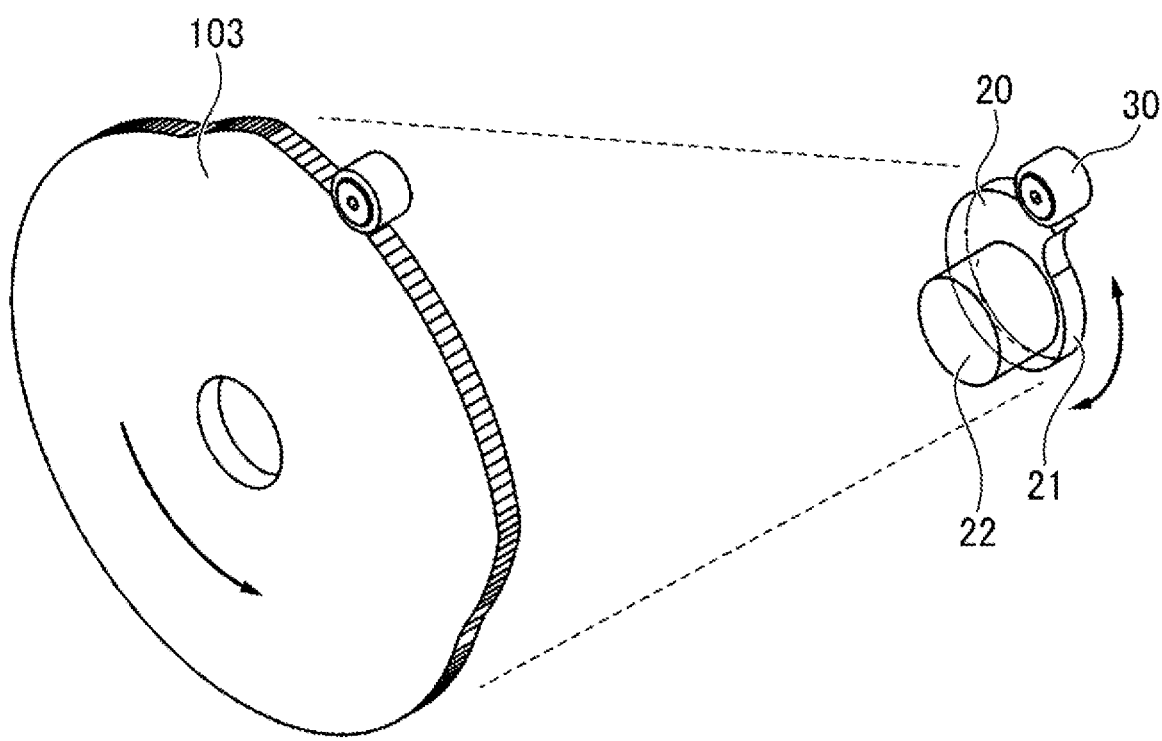
FIG. 3 is a perspective view illustrating a comparison between a conventional cam and the cam illustrated in FIG. 1.

Since the lift region 25 is formed of a single CV curve, a radius R (distance) from a center O of the camshaft 22 gradually increases from the vicinity of the rotary end 28 to the circumferential other end (open end 29). In the cam 20 of the present embodiment, to be specific, the lift region 25 is allocated in a range of allocation angle θ from the rotary end 28 to the open end 29. As a result, the pressure angle in the lift region 25 is reduced, and as illustrated in FIG. 3, the cam 20 is significantly miniaturized as compared with the cam plate 103 used in the conventional cam device.

Further, in the present embodiment, the pressure angle α at the rotary end 28 is set to 90°, and the non-continuous section 27 is formed parallel to the direction in which the cam roller 30 moves linearly.

The pressure angle α at the rotary end 28 is a pressure angle at which the cam roller 30 at the rotary end 28 contacts the non-continuous surface, and specifically, it represents an angle formed by the normal line of the cam surface in contact with the cam roller 30 and the traveling direction of the cam roller 30.

The rotary drive device M is a motor capable of controlling the forward rotation, reverse rotation, rotation stop, and rotation speed, and is formed of a servo motor, a pulse motor, and the like for example. The rotary drive device M is connected to the camshaft 22, and controls the cam 20 for the forward rotation, reverse rotation, rotation stop, and rotation speed by the control unit 1.

Figure 4:
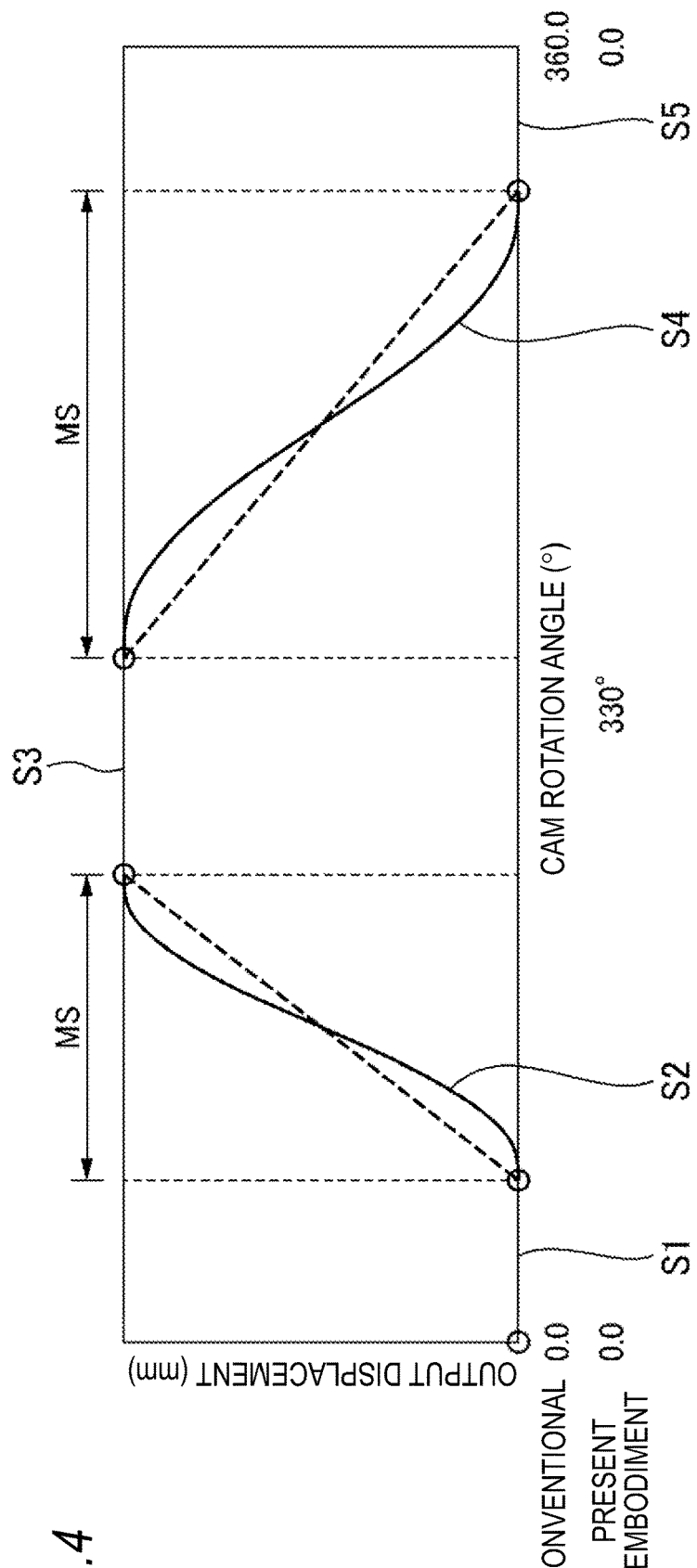
FIG. 4 is a cam diagram illustrating an output displacement of a cam roller of the cam device illustrated in FIG. 1.

Therefore, in the cam device 10 of the present embodiment, only the lift amount is provided by the cam profile, such that, for example, pause steps S1, S3, S5, a lift up step S2, and a lift down step S4 of the cam curve illustrated in FIG. 4 are provided by the rotation of the cam 20 controlled by the rotary drive device M. That is, the pause steps S1, S3, S5 are formed by stopping the cam 20 on the lift region 25, the lift up step S2 is formed by the forward rotation of the cam 20, and the lift down step S4 is formed by the reverse rotation of the cam 20.

Further, the cam curve characteristics of the lift up step S2 and the lift down step S4 are reproduced by controlling an angular velocity and an angular acceleration in the rotational motion of the cam 20 by the rotary drive device M. For example, the cam curve characteristics of a modified sine (MS) curve in the lift up step S2 and the lift down step S4 illustrated in FIG. 4 are reproduced by controlling the angular velocity and the angular acceleration of the cam 20 when passing through the lift region 25 formed of a single CV curve of the cam 20. Further, increasing the rotation speed of the cam 20 increases the displacement speed (steep gradient), and decreasing the rotation speed of the cam 20 decreases the displacement speed (gentle gradient).

The lift amount in the lift up step S2 and the lift down step S4 can be arbitrarily changed according to the rotation amount of the cam 20 by the rotary drive device M. That is, in the case of a cam curve having a plurality of lift up steps and a plurality of lift down steps, it is also possible to set a cam curve in which the lift amount in each lift up step and the lift amount in each lift down step are different from each other. However, it is necessary that the total lift amount in the lift up step and the total lift amount in the lift down step are the same lift amount. Further, the upper limit of the lift amount is limited by the maximum lift amount of the lift region 25.

Further, the output displacement in the lift up step S2 and the lift down step S4 is reproduced at a position in the rotational direction in the rotational motion of the cam 20, and the operation time of the lift up step S2 and the lift down step S4 is reproduced by the time of the rotational motion of the cam 20.

The positions (phases) and the number of pause steps S1, S3, S5 can be set to any position and any number of pause steps by setting the stop position and the number of stops of the cam 20 in the lift region 25. Further, the stop time of the pause steps S1, S3, S5 is reproduced by setting the stop time of the cam 20. As a result, it is also possible to easily set the pause step having different patterns (positions and lengths) from each other between the lift up step and the lift down step.

Meanwhile, in the case of the conventional cam plate 103 in which the camshaft is rotated in one direction at a constant speed, the cam curve characteristics and the amount of lift in the lift up step and the lift down step are provided by the profile of the cam surface of the cam plate 103, and the output displacement is reproduced at the position through which the cam roller passes. Further, the stop time of the pause step and the operation time of the lift up step and the lift down step are provided by the allocation angles of the lift up region, the lift down region, and the dwell region.

Therefore, the control unit 1 that controls an actuation of the rotary drive device M includes, as its functions, an angular velocity and angular acceleration control unit, a rotation amount control unit, a position control unit, a stop time control unit, and a motion time control unit. The angular velocity and angular acceleration control unit controls the angular velocity and the angular acceleration of the cam 20 in the rotational motion when the cam roller 30 passes through the lift region 25 formed of a single CV curve in order to reproduce the cam curve characteristics in the lift up step S2 and the lift down step S4. The rotation amount control unit controls the rotation amount of the cam 20 in the rotational motion in order to reproduce the lift amount in the lift up step S2 and the lift down step S4. The position control unit controls the position of the cam 20 in the rotational direction in the rotational motion in order to reproduce the output displacement in the lift up step S2 and the lift down step S4. The stop time control unit controls the stop time of the cam 20 in order to reproduce the stop time in the pause steps S1, S3, S5. The motion time control unit controls the rotational motion time of the cam 20 in order to reproduce the operation time in the lift up step S2 and the lift down step S4.

Figure 5:
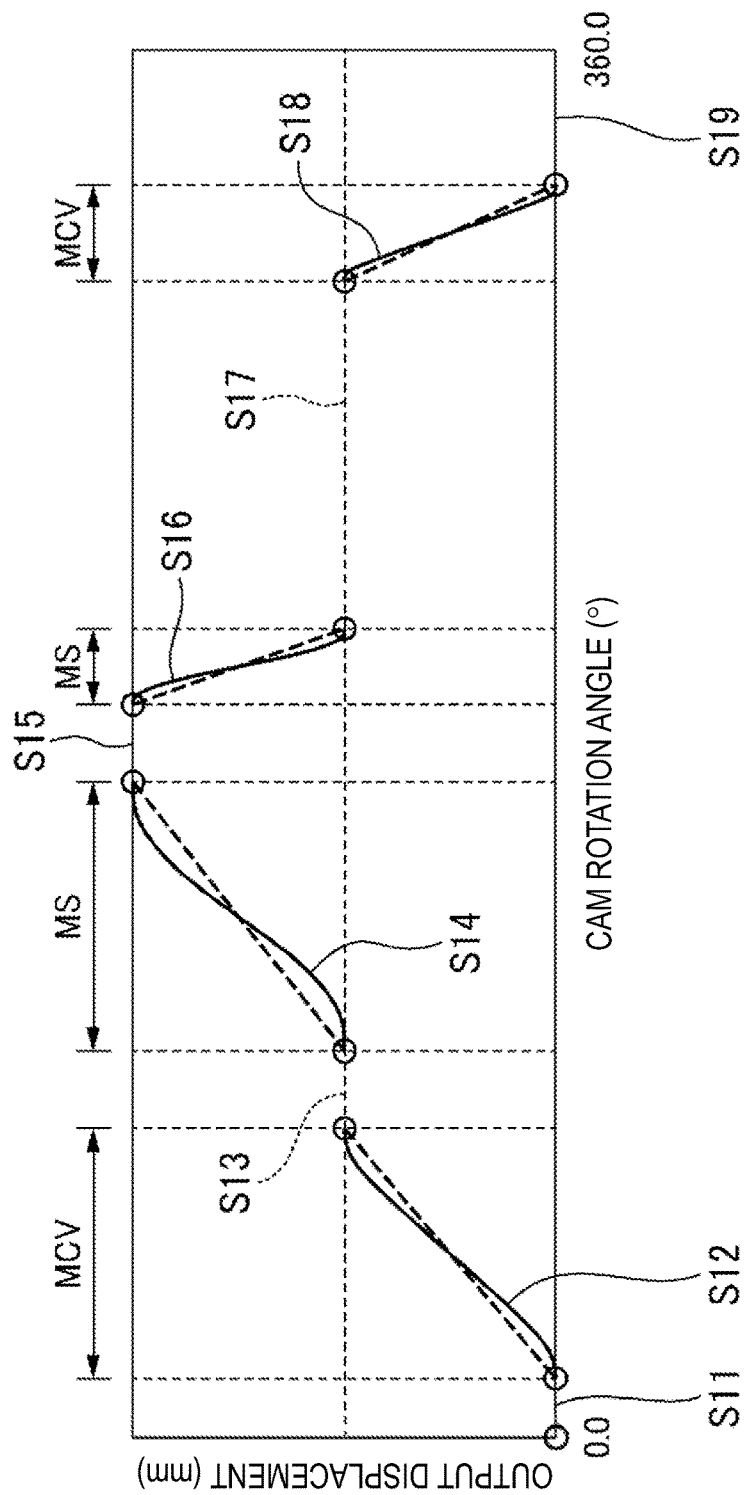
FIG. 5 is another cam diagram illustrating the output displacement of the cam roller by the cam device.

Further, the other cam curve illustrated in FIG. 5 can be reproduced by using a cam 20a of the present embodiment illustrated in FIG. 6B instead of a conventional cam plate 103a illustrated in FIG. 6A.

That is, the cam plate 103a of FIG. 6A that is rotated forward at a constant speed is in line with the cam curve of FIG. 5, and has a first dwell region 111, a first lift up region 112, a second dwell region 113 providing a modified constant velocity (MCV) curve, a second lift up region 114, a third dwell region 115 providing a modified sine (MS) curve, a first lift down region 116, a fourth dwell region 117 providing a MS curve, and a second lift down region 118 providing a MCV curve, forming a closed curve.

Then, by rotating the plate cam 103a, the first dwell region 111 forms the first pause step S11 and the fifth pause step S19, the first lift up region 112 forms the first lift up step S12, the second dwell region 113 forms the second pause step S13, the second lift up region 114 forms the second lift up step S14, and the third dwell region 115 forms the third pause step S15. Further, the first lift down region 116 forms the first lift down step S16, the fourth dwell region 117 forms the fourth pause step S17, and the second lift down region 118 forms the second lift down step S18.

Meanwhile, the cam 20a of the present embodiment illustrated in FIG. 6B is formed of the rotary end 28, the lift region 25 formed of a single CV curve, and the non-continuous section 27, and is smaller than the conventional cam 103a. Even when the cam 20a is used, the rotary drive device M can perform rotational driving by controlling the forward rotation, reverse rotation, rotation stop, and rotation speed of the cam 20a, thereby reproducing a cam curve including the first and second lift up steps S12 and S14, the first and second lift down steps S16, S18, and the first to fifth pause steps S11, S13, S15, S17, S19 illustrated in FIG. 5.

Figure 7A:
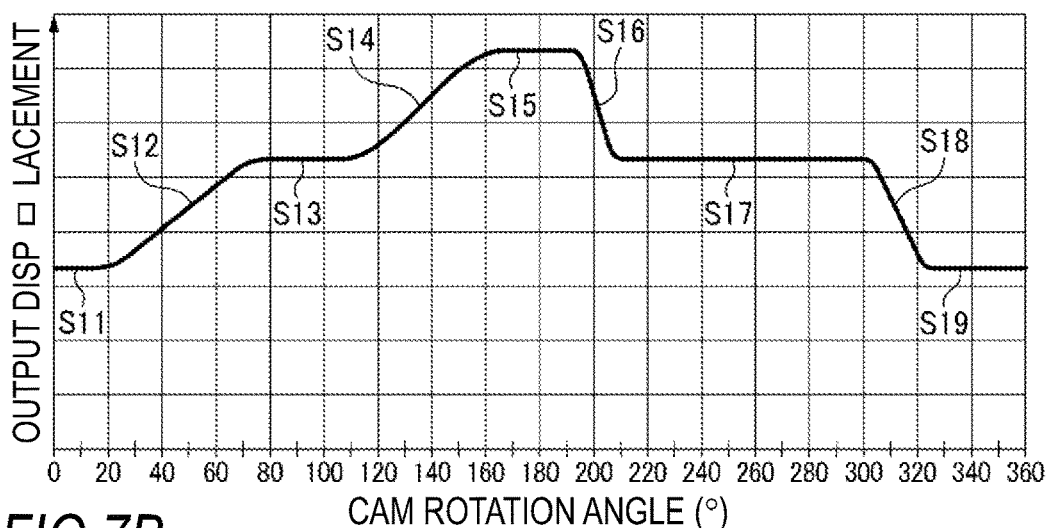
FIGS. 7A to 7C are graphs illustrating output displacement, cam angular velocity, and angular acceleration in different cam diagrams from FIG. 5, respectively.
Figure 7B:
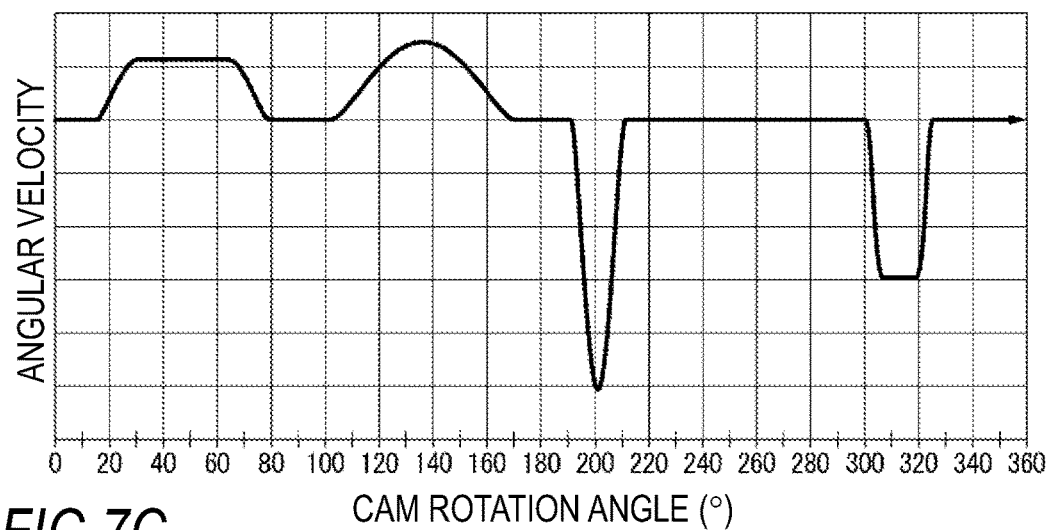
Figure 7C:
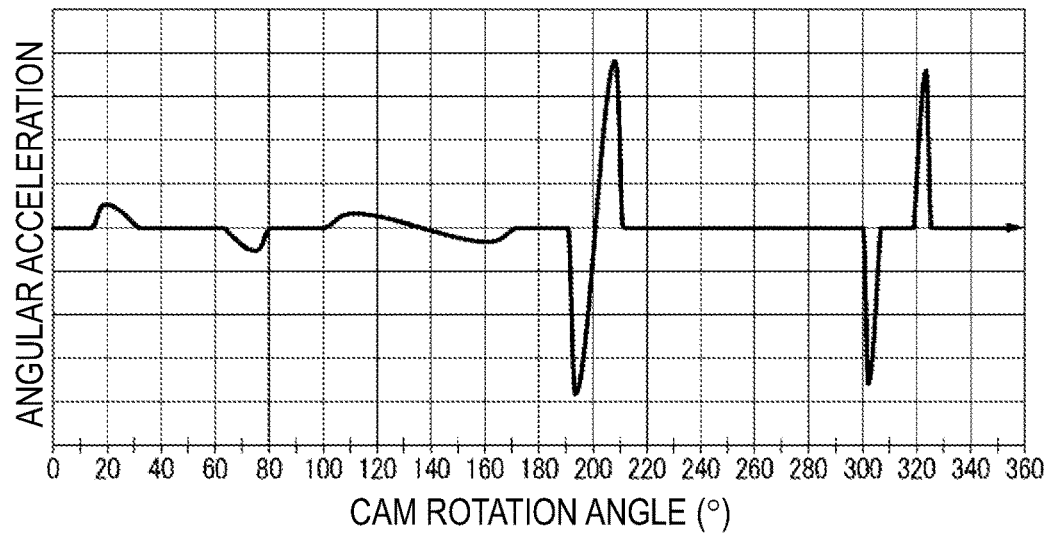

That is, as illustrated in FIGS. 7A to 7C, the first lift up step S12 providing the MCV curve, the second lift up step S14 providing the MS curve, the first lift down step S16 providing the MS curve, and the second lift down step S18 providing the MCV curve are provided by controlling the angular velocity and the angular acceleration in the rotational motion of the cam 20a when the cam roller 30 passes through the lift region 25 of the cam 20a formed of the CV curve during the forward rotation and the reverse rotation of the cam 20a.

In addition, the lift amount of the cam roller 30 can be reproduced by the rotation amount of the cam 20a during the rotational motion. Further, the position of the cam roller 30 can be provided by the position of the cam 20a in the rotational direction. In addition, the stop time of each of the pause steps S11, S13, S15, S17, S19 can be reproduced by the stop time of the cam 20a. In addition, the lift time of the first and second lift up steps S12, S14 and the first and second lift down steps S16, S18 can be provided by the time of the rotational motion of the cam 20a.

The cam roller 30 is rotatably supported by the driven member 50, and linearly moved by the rotational motion of the cam 20 to drive the driven member 50 and the action unit 60 in an interlocking manner in the vertical direction.

The linear motion guide device 40 includes a guide rail 41 attached to the fixing member 53 for fixing the rotary drive device M, and a slider 42 attached to the driven member 50 linearly moved together with the cam roller 30.

Therefore, the driven member 50 is formed by bending a surface 51 to which the cam roller 30 and the pressing spring 61 are attached and a surface 52 to which the slider 42 is attached, and a notch 51a is formed on the surface 51 so as to avoid interference with the cam surface 21 when the cam 20 is rotatably moved.

In addition, the pressing spring 61 may be directly attached to a support shaft 30a of the cam roller 30. Further, the arrangement of the cam device 10 of the present embodiment can be appropriately changed according to the shape and size of the device, and the motor arrangement may also be adjusted by using a gear, a belt or the like as necessary.

As described above, the cam device 10 of the present embodiment converts a reciprocating rotation into a linear motion of the cam roller 30 by the reciprocating rotation of the cam 20. At that time, in the cam 20, the cam roller 30 does not rotate beyond the non-continuous section 27. The linear motion described herein is not limited to the linear motion of the cam roller 30 as in the present embodiment, but also includes the swing motion of the cam roller 30 centered on the other end of a link connected to the cam roller 30.

As described above, in the cam device 10 of the present embodiment, since the lift up step S2 and the lift down step S4 are formed in the same lift region 25 by the forward rotation and the reverse rotation, an allocation angle θ of the lift region 25 can be increased as compared with the conventional cam device. As a result, the pressure angle in the lift region 25 can be reduced to enable smooth actuation, and the cam device 10 can be miniaturized.

Figure 8:
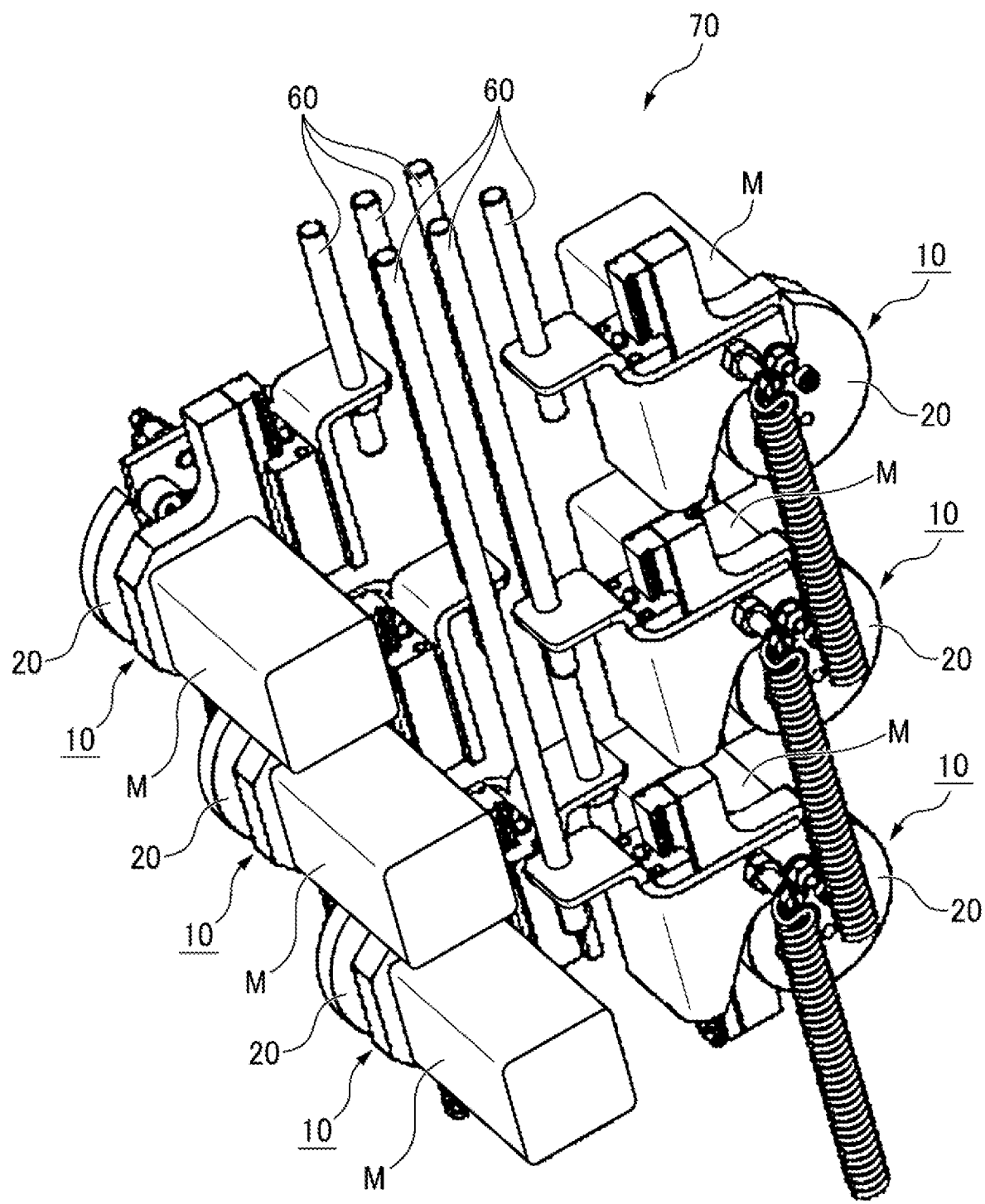
FIG. 8 is a perspective view illustrating a bearing manufacturing device using the cam device of FIG. 1.

Here, a bearing manufacturing device 70 including six integrated action units 61, in which a plurality of cam devices 10 (six, in the present embodiment) of the present embodiment illustrated in FIG. 8 are arranged, will be described in comparison with the conventional bearing manufacturing device 100 illustrated in FIG. 9.

In the conventional bearing manufacturing device 100 illustrated in FIG. 9, as an example, the cam plate 103 performs a single ascending and descending operation on an MCV curve having a lift amount of 12 mm. The allocation angle is 30° in the first lift region and 25° in the second lift region, the diameter of the camshaft 22 is ϕ28 mm, and the diameter of the cam roller 30 is ϕ16 mm. In addition, the radius of the cam plate 103 is designed to be 87.5 mm, the pressure angle is designed to be 30°.

In contrast, in the cam device 10 of the present embodiment that performs the same operation, only one CV curve having a lift of 12 mm is machined on the cam 20 over the allocation angle θ of 315°. On both sides of the lift region 25 of the CV curve, there is only the slightly continuous extension of the CV curve for machining, the non-continuous section 27 and the rotary end 28.

The cam 20 is connected to the rotary drive device M formed of a servomotor, and stops the camshaft 22 at the timing when the cam roller 30 passes through the dwell region of the conventional cam plate 103. Further, at the timing of the first and second lift regions provided at the conventional allocation angles of 30° and 25°, the lift region 25 having the allocation angle θ of 315° is passed such that the allocation times are equal to each other. At this time, conventionally, the camshaft 22 is inverted to the forward direction and the reverse direction and passed through the lift region 25 to reproduce the lift up and lift down.

Conventionally, due to this structure, the maximum radius of the cam plate 103 is 87.5 mm, but in the present embodiment, the maximum radius R of the cam 20 is significantly reduced to 28 mm. At this time, the pressure angle α is merely 6° or less, and further miniaturization is possible if it is allowed to reduce the diameter of the camshaft 22.

Further, when the cam device 10 is integrated into the manufacturing device 70 having a plurality of action units 61 as in the present embodiment, since the rotary drive device M of the camshaft 22 is rotated individually for each cam 20, while the number of the rotary drive devices M is increased compared to the conventional drive motor 105 where all cams are rotated at once, each of the rotary drive devices M can be reduced in size. Further, since it is not necessary to have the cams 20 in one place, by arranging the cam 20 and the rotary drive device M in the vicinity of the action unit 61, the need for the intermediate link mechanism can be eliminated or it can be in reduced size. The interlocking of the respective action units 61 is achieved by the interlocking operation of the rotary drive device M of each cam 20.

The plurality of rotary drive devices M may be individually rotated at different rotation speeds.

Therefore, for example, while at least one of the plurality of cam devices 10 is lifting up or down the cam roller 30, a state of suspending the cam roller 30 with at least another one of the plurality of cam devices 10 can be realized by driving each of the rotary drive devices M of the plurality of cam devices 10.

As described above, in the cam device 10 of the present embodiment, the allocation angle θ with respect to the lift region 25 can be made extremely large, and the cam 20 can be significantly miniaturized as compared with the mechanism of the conventional plate cam 20 in which the cam surface is a continuous closed track. That is, the cam device 10 of the present embodiment has both the function of miniaturizing the cam device 10 and the function of reducing the pressure angle in the lift region 25 to smooth the actuation. Further, the cam profile can be varied by changing the rotation speed of the cam 20.

Further, in order to collectively arrange the plurality of action units 61, the plurality of cam devices 10 of the present embodiment can be arranged extremely compactly by being arranged so as to be overlapped in the moving direction (vertical direction) of the cam roller 30 and offset in the axial direction of the camshaft 22 and the direction orthogonal to the moving direction of the cam roller 30.

In addition, the bearing manufacturing device 100 described above is suitably used in a ball assembling step of a ball bearing 0, for example.

As described above, the cam device 10 of the present embodiment includes the cam 20 rotatably moved around the camshaft 22 in the forward and reverse directions, the cam roller 30 linearly moved by the rotational motion of the cam 20 around the camshaft 22, the rotary drive device M that rotationally drives the camshaft 22 by controlling the forward rotation, the reverse rotation, the rotation stop, and the rotation speed, the linear motion guide device 40 that guides the driven member 50 that is linearly moved along with the cam roller 30, and the action unit 60 attached to the driven member 50. The cam surface 21 forming the cam profile of the cam 20 includes, the rotary end 28 at the circumferential one end, at which the camshaft 22 is non-rotatatable in a reverse direction by the cam roller 30, the lift region 25 from the rotary end 28 to the circumferential other end, on which the cam roller 30 is abuttable, and formed of a single CV curve from the vicinity of the rotary end 28 to the circumferential other end, and a non-continuous section formed between the rotary end 28 and the circumferential other end and not in contact with the cam roller 30. As a result, as compared with the conventional cam plate 103 that performs the same actuation, a significant miniaturization is possible, and subsequently, the entire cam device including the linear motion guide device 40 can also be miniaturized. Further, the operation profile by the cam 20 can be varied by the rotary drive device M.

Further, since the cam roller 30 or the driven member 50 is further provided with the pressing spring 61 that urges the cam roller 30 toward the camshaft 22, stable behavior of the cam roller 30 can be provided.

Further, the bearing manufacturing device 70 and the manufacturing method of the present embodiment include a plurality of cam devices 10, and the cams 20 of the plurality of cam devices 10 can be separately driven by the respective rotary drive devices M. Therefore, according to the bearing manufacturing device 70 and the manufacturing method, while at least one of the plurality of cam devices 10 is lifting up or down the cam roller 30, a state of suspending the cam roller 30 with at least another one of the plurality of cam devices 10 can be realized by driving each of the rotary drive devices M of the plurality of cam devices 10. Therefore, even when a plurality of action units 61 are interlocked while synchronizing with each other, the cam 20 can be miniaturized, and the entire manufacturing device 70 can also be miniaturized.

It should be noted that the present invention is not limited to the embodiments described above, but may encompass modifications or improvements, as appropriate.

For example, the manufacturing device and manufacturing method using the cam device 10 is not limited to the bearing manufacturing device and manufacturing method, and can be applied to a manufacturing device and manufacturing method of parts and machines, that is, to manufacturing of vehicle parts such as an electric power steering device or the like, manufacturing of parts of various machines (regardless of power), and manufacturing of electrical parts.

REFERENCE SIGNS LIST

- 10 cam device
- 20 cam
- 21 cam surface
- 22 camshaft
- 25 lift region
- 27 non-continuous section
- 28 rotary end
- 30 cam roller
- S1, S3, S5 pause step
- S2 lift up step
- S4 lift down step
- $\alpha$ pressure angle at rotary end
- $\theta$ allocation angle

The invention claimed is:

1. A cam device comprising:
    a cam integrally attached to a camshaft to rotatably move around the camshaft in forward and reverse directions, wherein the cam is a single cam and is the only cam of the cam device;
    a cam roller linearly moved by a rotational motion of the cam around the camshaft;
    a rotary drive device that rotationally drives the camshaft to minimize the cam device by controlling a forward rotation, a reverse rotation, a rotation stop, and a rotation speed;
    a linear motion guide device that guides a driven member that is linearly moved along with the cam roller; and
    an action unit attached to the driven member, wherein
    a cam surface forming a cam profile of the cam includes a rotary end at a circumferential one end, at which the camshaft is non-rotatable in the reverse direction by the cam roller, a lift region from the rotary end to the circumferential other end, on which the cam roller is abuttable, and formed of a single constant velocity curve from a vicinity of the rotary end to the circumferential other end, and a non-continuous section formed between the rotary end and the circumferential other end.

2. The cam device according to claim 1, wherein:
    the rotary drive device performs one of rotational driving by controlling the forward rotation, the reverse rotation, the rotation stop, and the rotation speed of the camshaft, thereby realizing a cam shape including a lift up step, a lift down step, and a pause step;
    cam curve characteristics in the lift up step and the lift down step are reproduced by controlling an angular velocity and an angular acceleration in the rotational motion of the cam when the cam roller passes through the lift region formed of the single constant velocity curve;
    a lift amount in the lift up step and the lift down step is reproduced by a rotation amount in the rotational motion of the cam;
    an output displacement in the lift up step and the lift down step is reproduced at a position in a rotational direction in the rotational motion of the cam;
    a stop time in the pause step is reproduced by a stop time of the cam; and
    an operation time in the lift up step and the lift down step is reproduced by a time of the rotational motion of the cam.

3. The cam device according to claim 1 comprising:
    a control unit that controls an actuation of the rotary drive device such that the rotary drive device performs any of rotational driving by controlling the forward rotation, the reverse rotation, the rotation stop, and the rotation speed of the camshaft, in order to realize a cam shape including a lift up step, a lift down step, and a pause step, wherein
    the control unit includes:
        an angular velocity and angular acceleration control unit that controls an angular velocity and an angular acceleration in the rotational motion of the cam when the cam roller passes through the lift region formed of the single constant velocity curve in order to reproduce cam curve characteristics in the lift up step and the lift down step;
        a rotation amount control unit that controls a rotation amount in the rotational motion of the cam in order to reproduce a lift amount in the lift up step and the lift down step;
        a position control unit that controls a position in a rotational direction in the rotational motion of the cam in order to reproduce an output displacement in the lift up step and the lift down step;
        a stop time control unit that controls a stop time of the cam in order to reproduce a stop time in the pause step; and
        a motion time control unit that controls a rotational motion time of the cam in order to reproduce an operation time in the lift up step and the lift down step.

4. The cam device according to claim 1, further comprising
    a pressing spring for urging the cam roller toward the camshaft on a support shaft or the driven member of the cam roller.

5. A part manufacturing device including a plurality of cam devices according to claim 1, wherein:
    cams of the plurality of cam devices can be separately driven by respective rotary drive devices; and
    while at least one of the plurality of cam devices is lifting up or down the cam roller, a state of suspending the cam roller with at least another one of the plurality of cam devices can be realized by driving each of the rotary drive devices of the plurality of cam devices.

6. A bearing manufacturing device including a plurality of cam devices according to claim 1, wherein:
    cams of the plurality of cam devices can be separately driven by respective rotary drive devices; and
    while at least one of the plurality of cam devices is lifting up or down the cam roller, a state of suspending the cam roller with at least another one of the plurality of cam devices can be realized by driving each of the rotary drive devices of the plurality of cam devices.

7. A method for manufacturing a part, the method includes manufacturing the part by using a plurality of cam devices according to claim 1, wherein:
   cams of the plurality of cam devices are separately driven by respective rotary drive devices; and
   while at least one of the plurality of cam devices is lifting up or down the cam roller, a state of suspending the cam roller with at least another one of the plurality of cam devices can be realized by driving each of the rotary drive devices of the plurality of cam devices.

8. A method for manufacturing a machine, the method includes manufacturing the machine by using a plurality of cam devices according to claim 1, wherein:
   cams of the plurality of cam devices are separately driven by respective rotary drive devices; and
   while at least one of the plurality of cam devices is lifting up or down the cam roller, a state of suspending the cam roller with at least another one of the plurality of cam devices can be realized by driving each of the rotary drive devices of the plurality of cam devices.

\* \* \* \* \*